(12) United States Patent
Rafique

(10) Patent No.: US 11,916,639 B2
(45) Date of Patent: Feb. 27, 2024

(54) ANTENNA APPARATUS AND METHOD IN AN ANTENNA APPARATUS FOR SELECTIVELY COMBINING ANTENNA OUTPUTS

(71) Applicant: Telefonaktiebolaget LM Ericsson (publ), Stockholm (SE)

(72) Inventor: Raihan Rafique, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/908,276

(22) PCT Filed: Mar. 12, 2020

(86) PCT No.: PCT/SE2020/050266
§ 371 (c)(1),
(2) Date: Aug. 31, 2022

(87) PCT Pub. No.: WO2021/183015
PCT Pub. Date: Sep. 16, 2021

(65) Prior Publication Data
US 2023/0085981 A1    Mar. 23, 2023

(51) Int. Cl.
*H04B 7/08* (2006.01)
(52) U.S. Cl.
CPC .......... *H04B 7/0808* (2013.01); *H04B 7/0857* (2013.01)
(58) Field of Classification Search
CPC ............................ H04B 7/0808; H04B 7/0857
See application file for complete search history.

(56) References Cited

U.S. PATENT DOCUMENTS

| 4,123,759 A | 10/1978 | Hines et al. | |
| 7,324,047 B2 * | 1/2008 | Yamamoto | H04B 7/0857 342/383 |
| 7,831,232 B2 * | 11/2010 | Nakaya | H04B 7/0874 455/562.1 |

(Continued)

FOREIGN PATENT DOCUMENTS

| CN | 101127511 A | 2/2008 |
| CN | 107734614 A | 2/2018 |

(Continued)

OTHER PUBLICATIONS

Chaour, Issam, et al., "Enhanced Passive RF-DC Converter Circuit Efficiency for Low RF Energy Harvesting", Sensors, vol. 17, No. 546, MDPI, Mar. 9, 2017, 1-14.

(Continued)

*Primary Examiner* — Jean B Corrielus
(74) *Attorney, Agent, or Firm* — Murphy, Bilak & Homiller, PLLC

(57) ABSTRACT

Methods and apparatus are provided. In an example aspect, a method in an antenna apparatus is provided. The antenna apparatus comprises an antenna array comprising a plurality of antennas. The method comprises comparing output of a first antenna of the plurality of antennas with a threshold based on output of at least one other antenna of the plurality of antennas, and based on the comparing, selectively combining the output of the first antenna with the output of the other antennas of the plurality of antennas to provide a combined signal.

20 Claims, 8 Drawing Sheets

(56) References Cited

U.S. PATENT DOCUMENTS

| | | | |
|---|---|---|---|
| 8,660,507 B1 * | 2/2014 | Mansour | H04B 7/0874 455/135 |
| 2002/0004375 A1 | 1/2002 | Spencer et al. | |
| 2003/0060178 A1 | 3/2003 | Ghassemzadeh et al. | |
| 2005/0113048 A1 * | 5/2005 | Miyahara | H04B 7/0874 455/140 |
| 2006/0014511 A1 * | 1/2006 | Ghassemzadeh | H04B 7/0874 455/277.1 |
| 2007/0010202 A1 * | 1/2007 | Yamamoto | H04B 7/0848 455/63.1 |
| 2008/0081588 A1 | 4/2008 | Rofougaran | |
| 2009/0149146 A1 | 6/2009 | Emrick et al. | |
| 2009/0196371 A1 * | 8/2009 | Yamamoto | H04B 7/0808 375/267 |
| 2010/0159840 A1 | 6/2010 | Rosener et al. | |
| 2011/0103273 A1 | 5/2011 | Dutta | |
| 2011/0200089 A1 * | 8/2011 | Umeda | H04L 27/2647 375/232 |
| 2015/0195029 A1 * | 7/2015 | Laugeois | H04B 7/0808 375/349 |
| 2016/0119804 A1 | 4/2016 | He et al. | |
| 2016/0330750 A1 | 11/2016 | Lee | |

FOREIGN PATENT DOCUMENTS

| | | |
|---|---|---|
| JP | 2010153970 A | 7/2010 |
| KR | 20060009740 A | 2/2006 |
| KR | 20060074288 A | 7/2006 |
| KR | 20120007350 A | 1/2012 |
| WO | 2004017539 A1 | 2/2004 |
| WO | 2007068087 A1 | 6/2007 |
| WO | 2018166575 A1 | 9/2018 |

OTHER PUBLICATIONS

Niknejad, Ali M., "Lecture 14: Mosfet LNA Design", EECS 142 Integrated Circuits for Communication, University of California, Berkeley, 2005, 1-29.

* cited by examiner

ANTENNA APPARATUS AND METHOD IN AN ANTENNA APPARATUS FOR SELECTIVELY COMBINING ANTENNA OUTPUTS

TECHNICAL FIELD

Examples of the present disclosure relate to antenna apparatus, and methods in antenna apparatus.

BACKGROUND

In a wireless communication network, a wireless device or User Equipment (UE) may communicate with a node in the network such as a base station. The node in the network may be able to communicate with one or more other nodes in the network and may allow the UE to communicate with other nodes or devices in the network and/or an external network such as the internet.

A User Equipment (UE) is a mobile device in some cases, and thus the operating environment of the UE may change over time, for example due to a user moving the UE and/or objects moving around the UE. Consequences of the changing environment may include an object being moved close to or onto the antenna of the UE. The object may influence the impedance of the antenna, and thus matching condition of the antenna may be disrupted. FIG. 1 is a schematic of an example of a UE 100 that includes a main antenna 102, and a diversity antenna 104. The diversity antenna 104 may be used instead of the main antenna 102 when the matching condition of the main antenna 102 degrades, for example to reduce noise and improve signal to noise ratio (SNR).

More recent UEs may include advanced antenna systems (AAS). For example, the main antenna 102 and the diversity antenna 104 of the UE 100 shown in FIG. 1 may each comprise an AAS with multiple antenna elements. One of possible use of AAS is for beam forming.

FIG. 2 is a schematic of an example of an analog beam forming advanced antenna system (AAS) 200. In an analog AAS, RF components are combined (or divided, in a transmitter path) in the analog/RF domain after (or before, in a transmitter path) performing phase tuning with an analog circuit. This differs from digital beam forming where, rather than changing phase in the analog domain, delay is added in the digital domain, and combination or division may also be performed in the digital domain.

The AAS 200 of FIG. 2 includes an antenna array 202. In this example, the antenna array 202 includes four antennas. Each antenna includes a receiver path and a transmitter path. The receiver path and transmitter path of one of the antennas 204 is described, though each antenna may have a corresponding similar or identical transmitter and receiver path. In the receiver path, the antenna 204 is connected to a RF switch 206, which is in turn connected to a low noise amplifier (LNA) 208. The output of the LNA 208 is connected to a phase tuner 210, which is in turn connected to one or more RF combiners 212. The RF combiners combine all of the outputs of the respective phase tuners (which may compensate for phase differences between signals received at each antenna) in the receiver paths and provide the combined signal to a baseband processing unit 214.

In the transmitter path of the antenna 204, an output of the baseband processing unit is provided to one or more RF combiners 216 to split the signal into separate signals for each transmitter path. The signal for the transmitter path for antenna 204 is provided to a phase tuner 218 and then to a power amplifier (PA) 220. The output of the PA 220 is provided to rf switch 206. The RF switch 206 may be used to connect the antenna 204 to its receiver path or transmitter path. Thus the signal from the baseband processing unit may be phase tuned for each antenna.

A UE may include two or more AASs. Each AAS may include both receiver paths and transmitter paths for each antenna, and an obstacle may block not only the receiver paths but also the transmitter paths. That is, the matching condition for the antennas may be disrupted for both the receiver paths and the transmitter paths.

SUMMARY

One aspect of the present disclosure provides a method in an antenna apparatus. The antenna apparatus comprises an antenna array comprising a plurality of antennas. The method comprises comparing output of a first antenna of the plurality of antennas with a threshold based on output of at least one other antenna of the plurality of antennas, and based on the comparing, selectively combining the output of the first antenna with the output of the other antennas of the plurality of antennas to provide a combined signal.

Another aspect of the present disclosure provides antenna apparatus comprising an antenna array comprising a plurality of antennas, comparing apparatus configured to compare output of a first antenna of the plurality of antennas with a threshold based on output of at least one other antenna of the plurality of antennas, and combining apparatus configured to selectively combining the output of the first antenna with the output of the other antennas of the plurality of antennas to provide a combined signal based on the comparing.

Another aspect of the present disclosure provides receiver apparatus comprising the above antenna apparatus.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

In the presence of an object, impedance of an antenna may change. A change in impedance may result in low received signal power from the antenna (e.g. at an LNA connected to the antenna) and/or higher noise. This may be for example due to wave reflection (or more wave reflection) at the antenna or LNA.

Figure 1:
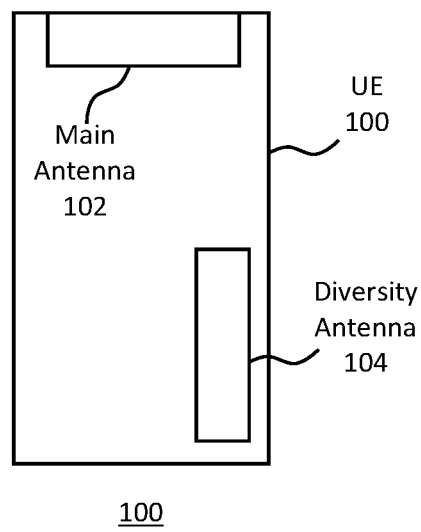
FIG. 1 is a schematic of an example of a UE.
Figure 2:
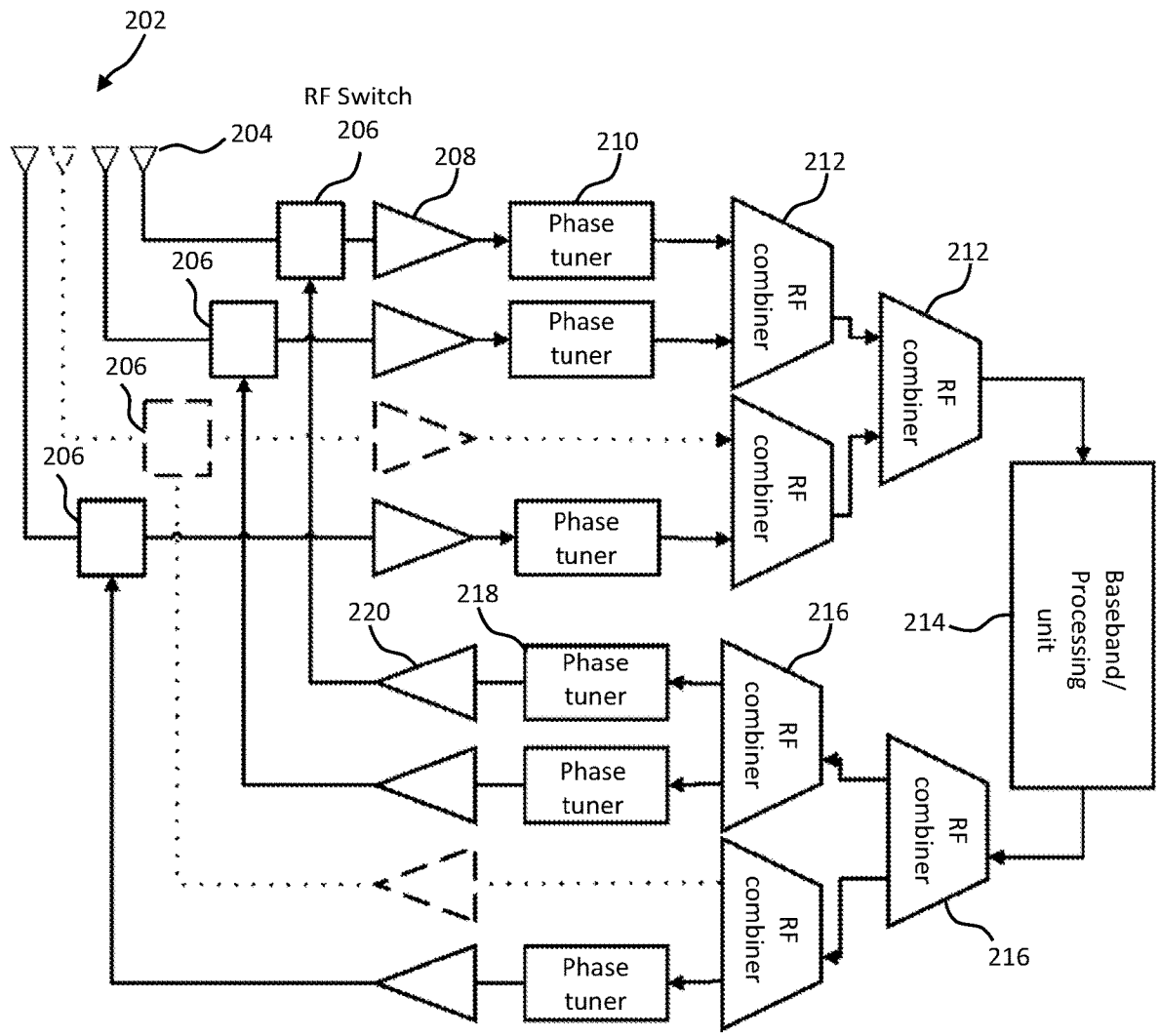
FIG. 2 is a schematic of an example of an analog beam forming advanced antenna system.

In UEs with multiple antenna systems such as the UE 100 shown in FIG. 1, when part of an antenna array is exposed to obstacle, LNA(s) in the receiver path(s) of one or more antenna elements (or antennas) may not receive as much of the received signal as LNAs associated with the other elements due to impedance mismatch at input. It may be the case that both main and diversity antennas or AASs are partially blocked, and hence switching between main and diversity antennas may not result in reduced noise or improved SNR.

In this situation, isolation of some of the affected antennas or LNAs may provide better results. Thus, embodiments of this disclosure provide antenna apparatus, such as for example an advanced antenna system (AAS), in which there are multiple antennas, and a respective signal from each antenna may (or may not) be combined into the overall signal (e.g. an overall signal provided to a baseband processor).

A first step in isolating an affected antenna or LNA is to identify it. In an antenna array for digital beam forming, it may be straightforward to identify an affected (e.g. blocked or partially blocked) antenna element as each element is connected with its own ADC for its respective receiver path. In analog beam forming AAS, an affected antenna may be identified using a calibration process. However, a calibration process for an analog AAS may need several steps and considerable computation requirements. In real-time operation, this may not be practical, particularly if the affected antenna(s) constantly change due to movement of the antenna array or surrounding objects.

Figure 3:
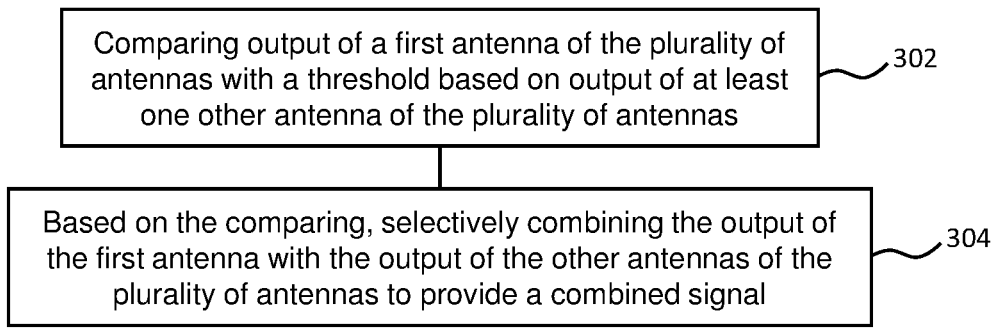
FIG. 3 is a flow chart of an example of a method in an antenna apparatus.

FIG. 3 is a flow chart of an example of a method 300 in an antenna apparatus. The antenna apparatus comprises an antenna array comprising a plurality of antennas. The method 300 comprises, in step 302, comparing output of a first antenna of the plurality of antennas with a threshold based on output of at least one other antenna of the plurality of antennas. The method 300 also comprises, in step 304, based on the comparing, selectively combining the output of the first antenna with the output of the other antennas of the plurality of antennas to provide a combined signal. This may comprise for example either combining or not combining the output of the first antenna with the output of the other antennas based on the comparing. The combined signal may be provided in some examples to a signal processor such as a baseband processor. The output of each antenna may comprise for example a signal level, power output, rectified signal etc from the antenna.

In some examples, each antenna of the plurality of antennas is associated with a respective amplifier, such as for example a LNA. Each antenna may for example be directly connected to its associated LNA. The output of each antenna therefore comprises the output of the amplifier associated with the antenna. Comparing the output of a first antenna of the plurality of antennas with a threshold based on output of at least one other antenna of the plurality of antennas in step 302 may therefore in some examples comprise comparing the output of the amplifier associated with the first antenna with a threshold based on the output of the at least one amplifier associated with the at least one other antenna. Selectively combining in step 304 in some examples may comprise either combining or not combining the output of the amplifier associated with the first antenna with the outputs of the amplifiers associated with the other antennas based on the comparing.

In some examples, the threshold is based on a sum of signals based on outputs from the plurality of antennas (e.g. a sum of outputs of amplifiers or LNAs associated with the antennas). The sum may be scaled to provide the threshold. Thus for example the decision whether or not to combine the output of the first antenna with that of the other antennas in the combined signal may be based for example on whether or not the output of the first signal (e.g. the output of its associated amplifier or LNA) exceeds the first threshold, which may in some examples reflect a certain proportion of the average output from the at least one other antenna (which in some examples may comprise all antennas including the first antenna). The sum may in some examples be scaled by a factor based on a signal to noise ratio (SNR) of the combined signal to provide the threshold. That is, for example, if the SNR of the combined signal is low, the factor may be reduced so that it is less likely that multiple antennas may be excluded from the combined signal. In some examples the threshold may be dynamic, for example periodically or continuously changing based on the sum of signals.

In some examples, the threshold comprises or is based on a sum of scaled signals based on outputs from the plurality of antennas. That is, for example, each signal output from each antenna is scaled by a respective factor associated with the antenna. This may be used for example to compensate for process variations across the antennas or their associated receive paths including any amplifiers. In some examples, the method comprises rectifying at least one signal output from the least one other antenna to provide the signals based on the outputs of the antennas. Thus the threshold can be based on the rectified signals, which may indicate a signal envelope of each antenna output or an indication of a signal level or signal amplitude. However, in such examples, the rectified signal is used to determine the threshold and is not (selectively) combined into the combined signal.

The antenna apparatus may in some examples comprise one or more signal combiners for combining signals from the antennas to provide the combined signal. In such examples, selectively combining the output of the first antenna with the output of the other antennas of the plurality of antennas to provide the combined signal in step 304 comprises selectively connecting the output of the first antenna to the one or more signal combiners based on the comparing, for example using a switch.

In some examples, the decision as to whether or not to combine the output of the first antenna into the combined signal is based on whether the output (e.g. signal level, signal power, amplitude, rectified signal etc) of the first antenna is above or below the threshold. For example, selectively combining the output of the first antenna with the output of the other antennas of the plurality of antennas to provide the combined signal in step 304 may comprise for example combining the output of the first antenna with the output of the other antennas when the output of the first antenna is greater than (or is greater than or equal to) the threshold. Furthermore, selectively combining the output of the first antenna with the output of the other antennas of the plurality of antennas to provide the combined signal in step 304 may comprise for example omitting the output of the first antenna from the combined signal when the output of the first antenna is less than the threshold, that is, deselecting the output of the first antenna from the combined signal, or choosing not to combine the output of the first antenna into the combined signal.

Comparing the output of the first antenna with the threshold based on the output of at least one other antenna in step 302 may in some examples comprise comparing the output of the first antenna with the threshold based on the output of all antennas of the plurality of antennas, including the output of the first antenna. Thus the threshold can be simply based on all of the antenna outputs without regard to whether any of the antennas are excluded from being combined into the combined signal, or which antenna is subject to the comparing in step 302.

In some examples, selectively combining the output of the first antenna with the output of the other antennas of the plurality of antennas to provide the combined signal comprises selectively operating a switch in a signal path of the first antenna based on the comparing.

The antenna apparatus may in some examples further comprise a plurality of transmitting apparatus (e.g. corresponding to a transmitter path for each of the antennas in the plurality of antennas). Each transmitting apparatus may be associated with a respective one of the antennas. The method may therefore comprise selectively connecting a first transmitting apparatus of the plurality of transmitting apparatus to the first antenna based on the comparing (and also, in some examples, based on whether a signal is being transmitted or received from the first antenna).

In the above examples of the method 300, the output of the first antenna is selectively combined into the combined signal. However, in some examples, the method can be applied to multiple ones or all of the antennas. For example, the method 300 may be applied to multiple antennas or all antennas to determine whether or not the output of each antenna is included in the combined signal. This can be done simultaneously or sequentially for the antennas. For example, the decision as to whether or not to include each antenna may be performed sequentially, and the decisions applied to the appropriate antennas simultaneously. Additionally or alternatively, examples of the method 300 may be performed continuously or periodically. Therefore for example the output from an antenna may be excluded from the combined signal if its output declines over time, and may be re-included if its output improves, for example due to movement of a UE including the antenna apparatus and/or movement of a nearby object.

Figure 4:
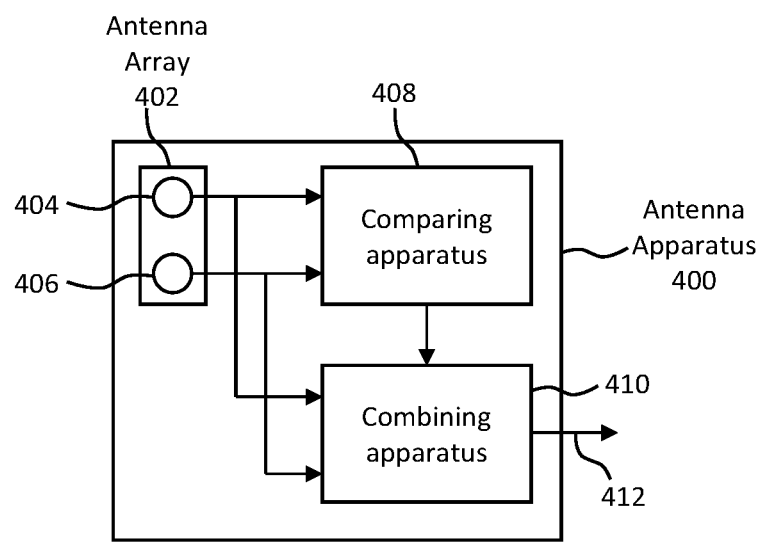
FIG. 4 is a schematic of an example of an antenna apparatus.

FIG. 4 is a schematic of an example of an antenna apparatus 400. The antenna apparatus comprises an antenna array 402 comprising a plurality of antennas. In this example, two antennas 404 and 406 are shown, though in other examples there may be more antennas. The antenna apparatus 400 further includes comparing apparatus 408, which is configured to compare output of a first antenna 404 of the plurality of antennas with a threshold based on output of at least one other antenna of the plurality of antennas. In this example, the threshold is based on the output of the other antenna 406. The antenna apparatus 400 also comprises combining apparatus 410, which is configured to selectively combine the output of the first antenna with the output of the other antennas of the plurality of antennas to provide a combined signal 412 based on the comparing. In some examples, the method 300 described above may be performed using the antenna apparatus 400.

Figure 5:
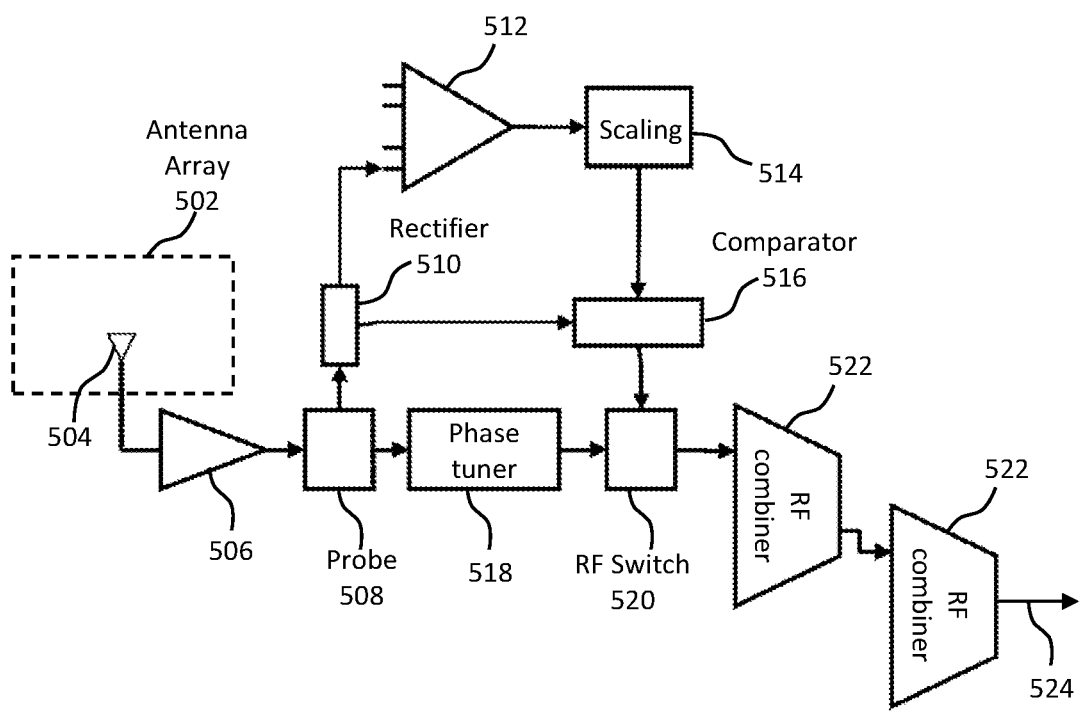
FIG. 5 is a schematic of another example of an antenna apparatus.

FIG. 5 is a schematic of an example of an antenna apparatus 500. This may comprise for example a more detailed example of the apparatus 400 of FIG. 4, and/or method 300 described above may be performed using the antenna apparatus 500. The antenna apparatus 500 includes an antenna array 502 comprising a plurality of antennas. In this example, only one antenna 504 is shown for clarity. The output of the antenna 504 is provided to a LNA 506, the output of which is provided to a probe 508. Thus in some examples the antenna apparatus 500 further comprises a plurality of amplifiers 506, each amplifier 506 associated with a respective one of the antennas 502, and the output of each antenna 502 comprises the output of the amplifier 506 associated with the antenna. In such examples the comparing apparatus may be configured to compare the output of a first antenna 504 of the plurality of antennas with a threshold based on output of at least one other antenna of the plurality of antennas by comparing the output of the amplifier 506 associated with the first antenna 504 with a threshold based on the output of the at least one amplifier 506 associated with the at least one other antenna.

The probe provides the signal from LNA 506 to a rectifier 510, and the output of the rectifier 510 is provided to summing amplifier 512. The summing amplifier 512 receives a rectified signal from the rectifier 510, and also a rectified version of signals from amplifiers (not shown) associated with the other antennas in the antenna array 502. Thus the output of the summing amplifier 512 is effectively for example the sum of rectified signals based on outputs of all of the antennas. The output of the summing amplifier 512 is provided to a scaling block 514 which scales the summed rectified signals, and the output of the scaling block is provided to comparator 516. The comparator 516 also receives the output of the rectifier 510. In some examples, the scaling block 514 (also referred to in some examples as a sum scaling apparatus) may be configured to scale the sum provided by the summing amplifier 512 by a factor based in some examples on a signal to noise ratio (SNR) of the combined signal to provide the threshold.

The signal from LNA 506 is also provided via the probe 508 to phase tuner 518, and then to RF switch 520. The output from the comparator 516 is used to control RF switch 520 to selectively connect the signal from phase tuner 520 to combining apparatus, which in this example is a plurality of RF combiners 520. The components 506, 508, 510, 518 and 520 are associated with the antenna 504, and in some examples of the antenna apparatus 500 these components may be duplicated for one or more, or all, of the other antennas in the antenna array 502. Thus for example the summing amplifier 512 receives n outputs from n rectifiers 510, where n is the number of antennas in the antenna array. Similarly, the combining apparatus receives outputs from n RF switches 520.

In operation, the summing amplifier 512 and scaling block 514 provide a scaled version of summed, scaled outputs of LNAs to comparator(s) 516, and each comparator 516 (one of which is shown in FIG. 5) controls an associated RF switch 520 in the receiver path of the associated antenna. If the output of the rectifier 510 falls below the output of the scaling block 514, i.e. falls below the threshold indicated by the scaling block 514, the corresponding RF switch 520 will be opened so as to prevent the signal from the associated antenna reaching the combining apparatus. If on the other hand the output of the rectifier is above the value from the scaling block 514, the switch may be closed so as to provide the signal from the phase tuner 518 to the combining apparatus. The combining apparatus (in this case, one or more RF combiners 522) may combine the output of one or more of the antennas (via the components including the phase tuners 518), based on the state of the corresponding RF switches 520, to provide a combined signal 524. (In examples as described herein, output of a rectifier may in some examples be filtered by a low pass filter, not shown for clarity).

Thus, for example, all the rectified signals from all LNAs may be summed then scaled to define the threshold. The rectified signal of each LNA associated with each antenna is compared with this threshold. When this threshold is larger than the rectified signal, that LNA is isolated using the corresponding RF switch. The comparison (e.g. by the comparator 516) may be performed in the analog or digital domain. In an example, an analog circuit can be used to compare the rectified output of the LNA with the combined contribution of LNA outputs in that array (i.e. scaled output of the summing amplifier 512). The switching event to control the switches 520 can be generated in some examples by using comparator circuitry.

Figure 6:
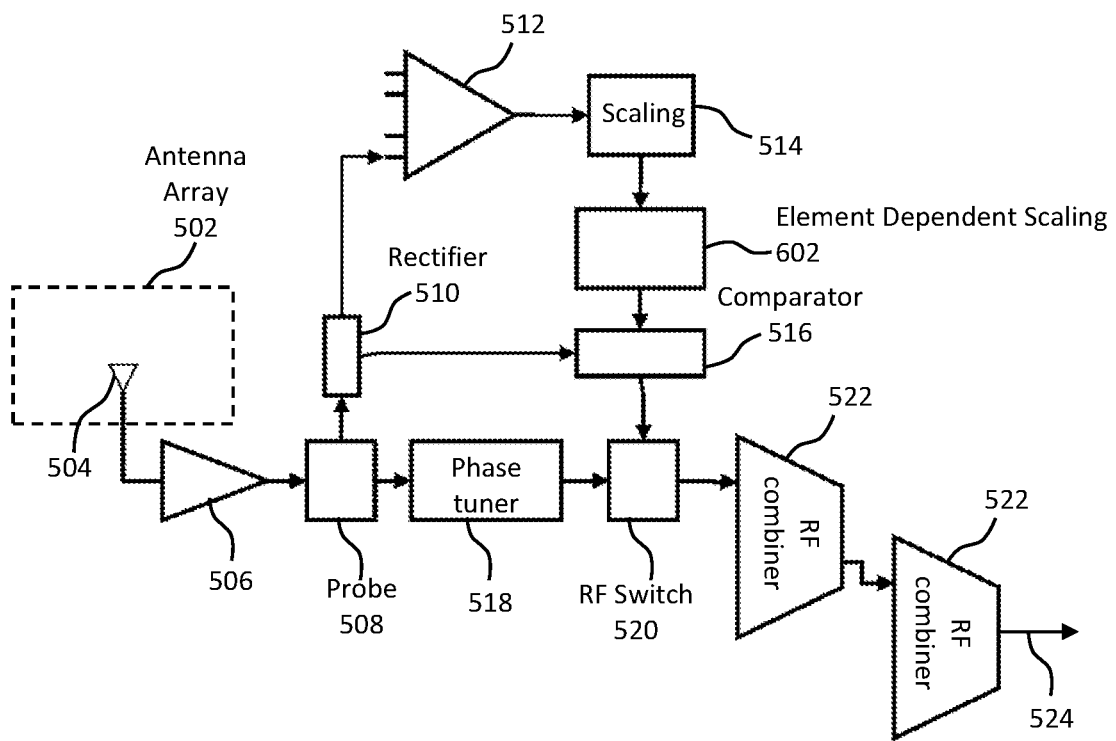
FIG. 6 is a schematic of another example of an antenna apparatus.

FIG. 6 is another schematic of an example of an antenna apparatus 600. This may comprise for example a more detailed example of the apparatus 400 of FIG. 4, and/or method 300 described above may be performed using the antenna apparatus 600. Components that are similar or identical to those shown in FIG. 5 are given the same reference numerals in FIG. 6.

The configuration of the antenna apparatus 600 of FIG. 6 is similar or identical to that of FIG. 5, except that an additional component, an element dependent scaling block 602, is provided between scaling block 514 and comparator 516. The components 506, 508, 510, 516, 518 and 520 and the element dependent scaling block 602 may be duplicated for each of one, more or all of the antennas in the antenna array 504. Thus in some examples the antenna apparatus 600 may include multiple element dependent scaling blocks 602, one for each antenna in the antenna array 502. The element dependent scaling block 602 may in some examples provide a scaling that is associated with the associated antenna, and may for example compensate for any variations in the antenna and/or any of the components 506, 508, 510, 516, 518 and 520 as compared to other antennas or their associate components. For example, the element dependent scaling block(s) may compensate for variation in coupling at the probe(s) 506. In some examples, the scaling performed by each of the element dependent scaling blocks can be predetermined and stored, for example at or after device manufacture.

In some examples, each antenna in the antenna array 502 may be associated with a respective element dependent scaling block 602, which may also be referred to as output scaling apparatus. Thus in some examples the antenna apparatus 600 may comprise a plurality of antenna output scaling apparatus 602, each antenna output scaling apparatus associated with a respective one of the antennas and configured to scale the output of the associated antennas. Thus the threshold may comprise a sum of scaled signals based on outputs from the plurality of antenna output scaling apparatus 602. In some examples, therefore, each antenna output scaling apparatus 602 is configured to scale the output of the associated antenna by a respective factor associated with the antenna, for example to compensate for process or other variations between the antennas and/or their associated components.

In some examples, the scaling performed by the scaling block 514 may instead be performed by the element dependent scaling blocks 602, with the element dependent scaling blocks collectively performing the scaling of the scaling block 514 as well as their antenna specific scaling, and hence the scaling block 514 may be omitted.

Figure 7:
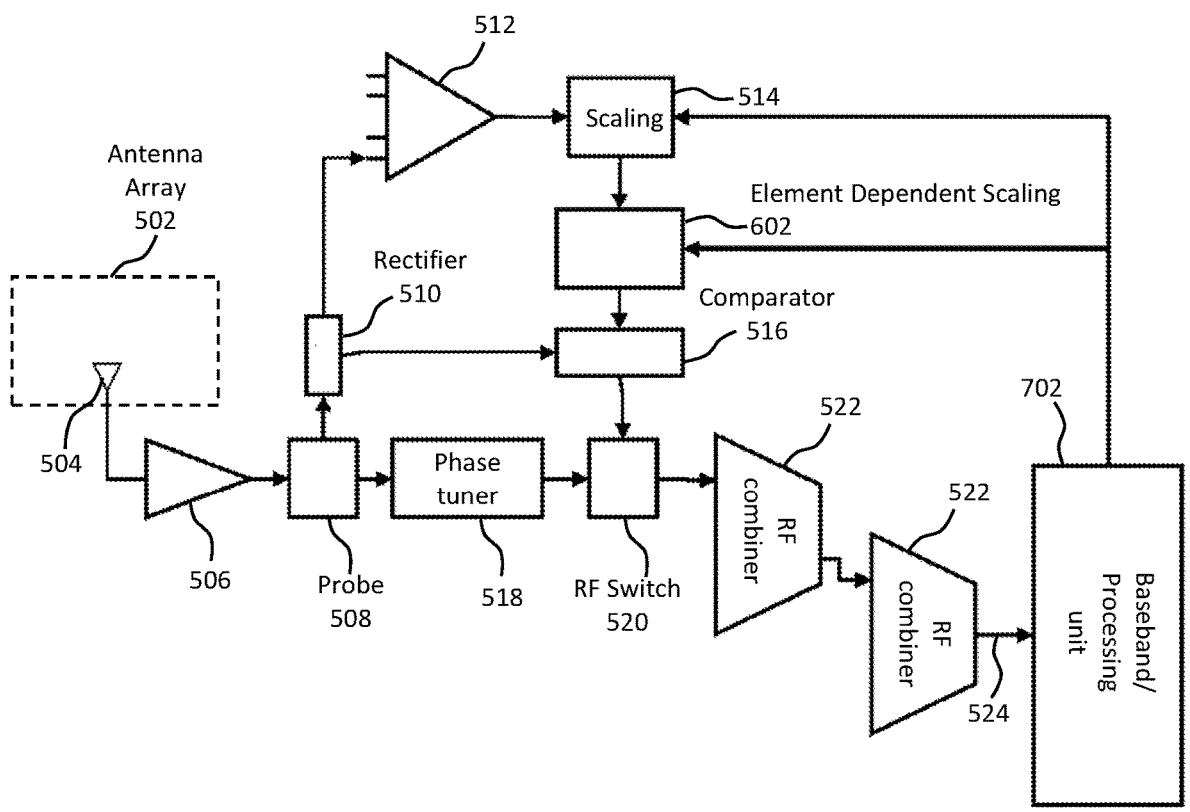
FIG. 7 is a schematic of an example of a receiver apparatus.

FIG. 7 is a schematic of an example of a receiver apparatus 700 that includes an antenna apparatus and a baseband processing unit 702 (i.e. a signal processor). The antenna apparatus is the antenna apparatus 600 shown in FIG. 6, and the scaling performed by the scaling block 514 and the element dependent scaling block 602 are controlled by the baseband processing unit 702. That is, the amount scaling performed by each of the scaling blocks 514, 602 may be controlled by the baseband processing unit 702. Components that are similar or identical to those shown in FIG. 6 are given the same reference numerals in FIG. 7. The components 506, 508, 510, 516, 518 and 520 and the element dependent scaling block 602 may be duplicated for each of one, more or all of the antennas in the antenna array 504. The baseband processing unit 702 receives the combined signal 524 from the combining apparatus. In some examples, the element dependent scaling block(s) 602 may be omitted, and thus for example the antenna apparatus may be the antenna apparatus 500 shown in FIG. 5. In other examples, the scaling block 514 may be omitted, with its function instead integrated into the element dependent scaling block(s) 602.

Figure 8:
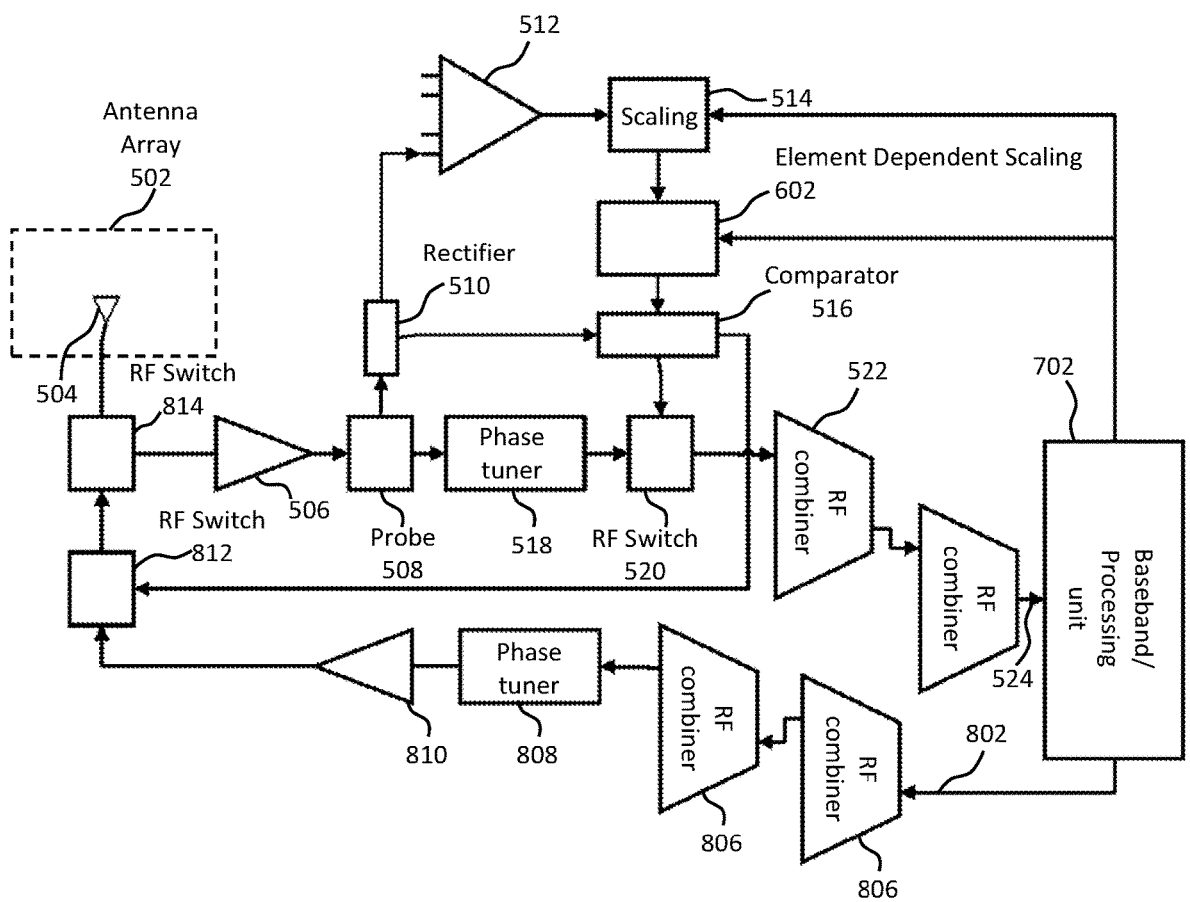
FIG. 8 is a schematic of an example of a transceiver apparatus.

FIG. 8 is a schematic of an example of a transceiver apparatus 800 (i.e. a transmitter and receiver apparatus) that includes an antenna apparatus and a baseband processing unit 702 (i.e. a signal processor). The antenna apparatus 800 includes components similar to the antenna apparatus 600 shown in FIG. 6, and thus components that are similar or identical to those shown in FIG. 6 are given the same reference numerals in FIG. 8. The scaling performed by the scaling block 514 and the element dependent scaling block 602 are controlled by the baseband processing unit 702. That is, the amount scaling performed by each of the scaling blocks 514, 602 may be controlled by the baseband processing unit 702. The components 506, 508, 510, 516, 518 and 520 and the element dependent scaling block 602 may be duplicated for each of one, more or all of the antennas in the antenna array 504. The baseband processing unit 702 receives the combined signal 524 from the combining apparatus. In some examples, the element dependent scaling block(s) 602 may be omitted. In other examples, the scaling block 514 may be omitted, with its function instead integrated into the element dependent scaling block(s) 602.

The antenna apparatus of the transceiver apparatus 800 includes a transmitter path for each antenna in the antenna array 502. Components for one transmitter path associated with one antenna 504 are shown, though in some examples the transmitter path components may be duplicated for one, some or all of the other antennas. The transmitter path of the antenna 504 receives a signal 802 from baseband processing unit 702 that is split into multiple signals by splitting apparatus (in this example, one or more RF combiners 806) that splits the signal into multiple signals, each for a respective transmitter path. The transmitter path of the antenna 504 includes a phase tuner 808 that receives the signal from the splitting apparatus. The output of the phase tuner 808 is provided to power amplifier (PA) 810, which amplifies the signal and provides it to RF switch 812. The RF switch is controlled by the comparator 516 in the same manner as the RF switch 520 in the corresponding receiver path for the antenna, and thus the RF switch 812 can be used to selectively connect the transmitter path to the antenna 504. However, in some examples, such as for example where the transceiver apparatus is used for time division duplex (TDD) communications, the output of the comparator 516 may be held or buffered so that the RF switch 812 can be appropriately controlled while the transceiver apparatus 800 is in transmitting mode instead of receiving mode. Such a buffer may be unused (or may continuously allow through the signals to be transmitted) in some examples such as for frequency division duplex (FDD) communications. Another RF switch 814 is connected between the antenna 504, switch 812 and LNA 506, to connect the antenna 504 to the receiver path or the transmitter path (for example in receiving mode or transmitting mode respectively). The RF switch 814 may be controlled for example by the baseband processing unit 702.

Figure 9:
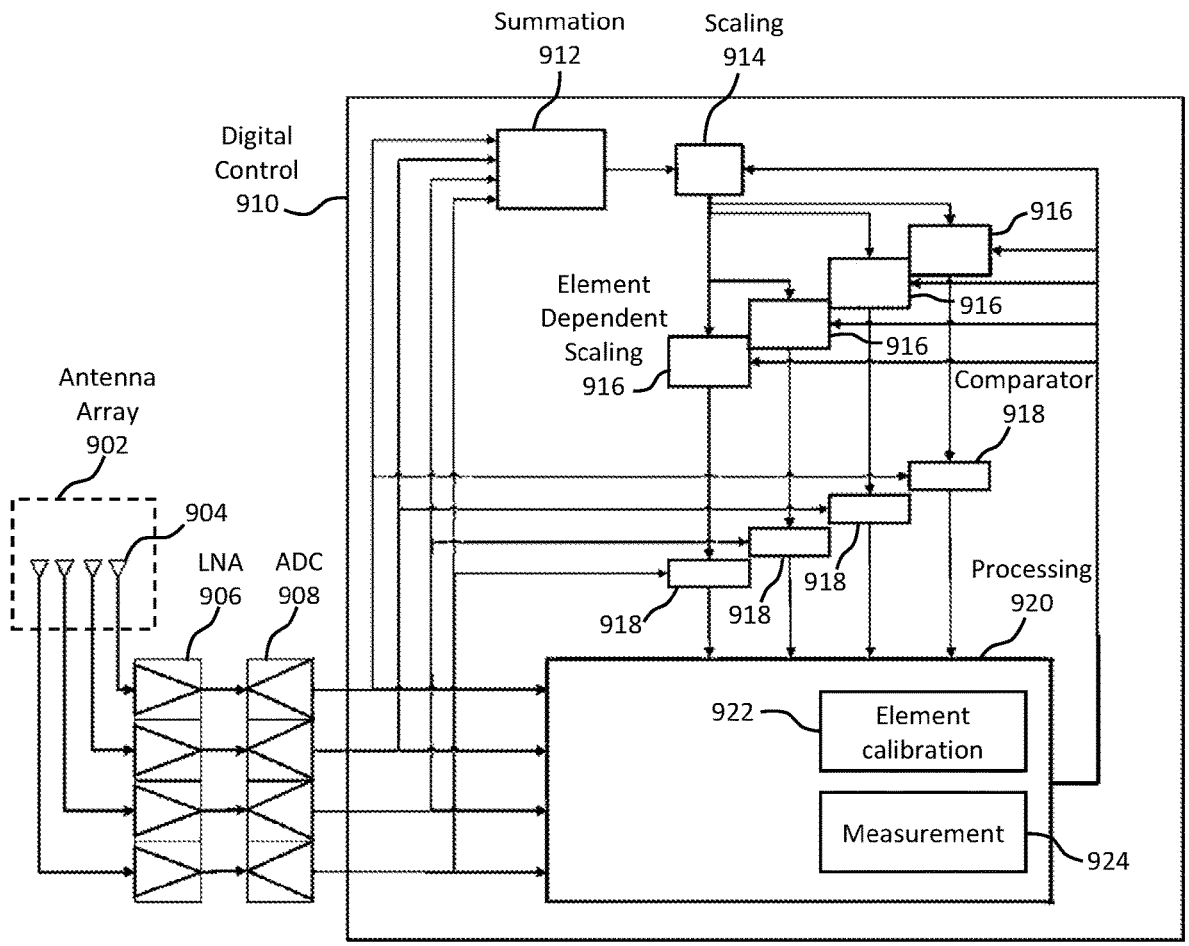
FIG. 9 is a schematic of another example of a receiver apparatus.

One or more components of the antenna apparatus and/or other apparatus described herein may be implemented in either the analog or digital domain. FIG. 9 is a schematic of an example of a receiver apparatus 900 including an antenna apparatus wherein several of the components are implemented digitally. The antenna apparatus includes an antenna array 902 including four antennas, though there may be two or more antennas in other examples. Components associated with one of the antennas 904 will be described, though there may also be similar or identical components associated with each of the other antennas (i.e. in each receive path). Antenna 904 is connected to LNA 906, and the output of LNA 906 is provided to an analog to digital converter (ADC) 908. The output of ADC 908 is provided to digital control block 910, which may comprise for example a digital signal processor or other processor. The digital signals from the ADCs 908 are all provided to summation block 912 which sums the digital signals, and thus may provide for example a function similar to the summing amplifiers 512 described above. The output of the summation block 912 is provided to scaling block 914, and the output of this block is provided to an element dependent scaling block 916 (there may be an element dependent scaling block associated with each of the antennas in the antenna array 902). The blocks 914 and 916 may in some examples provide functionality similar to the scaling blocks 514 and 516 described above.

The output of each element dependent scaling block 916 is provided to a respective comparator 918, and the outputs of the comparators are provided to a processing block 920, which may in some examples provide baseband processing functionality. In some examples, the processing block 920 may provide one or more signals to control the amount of scaling performed by one or more of the scaling block 914 and the element dependent scaling blocks 916. For example, element dependent scaling blocks 916 may be controlled to compensate for process or other variations between antennas in the antenna array 902, LNAs 906 and/or ADCs 908.

In some examples, the receiver apparatus 900 and/or the antenna apparatus therein may be configured to perform the method 300 described above. It should be noted that the blocks shown in the digital control block 910 are merely illustrative and equivalent functionality may be achieved in any suitable manner using digital control and/or software processing.

In the example shown in FIG. 9, the processing block 920 includes an element calibration block 922 and/or a measurement block 924. The measurement block 924 may in some examples measure a property of the received signal such as for example signal to noise ratio (SNR), signal to interference and noise ratio (SINR) and/or received signal strength indicator (RSSI). The measurement block 924 may measure one or more of these and/or one or more other signal properties, and use the measurements to determine the threshold used to selectively combine the output of each of the antennas (i.e. the output of the respective LNAs) into the combined signal. This combining may be done for example by the processing block 920. The element calibration block 922 may calibrate the element dependent scaling blocks 916 and/or the scaling block 914.

In some examples of a receiver apparatus described herein, once a decision is made as to whether to combine one or more antenna outputs into the combined signal, beam forming parameters may be updated, particularly for example where each antenna is also associated with a respective transmitter path. Optimal beam forming parameters may change if there is a change as to which antennas are to be used for transmitting (e.g. based on the state of the switches 812 shown in FIG. 8), and thus updating the beam forming parameters based on the antennas being used may allow for improved beam forming by the apparatus compared to if such parameters are not updated.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method in an antenna apparatus, the antenna apparatus comprising an antenna array comprising a plurality of antennas, the method comprising:
   comparing output of a first antenna of the plurality of antennas with a threshold based on output of at least one other antenna of the plurality of antennas; and
   based on the comparing, selectively combining the output of the first antenna with the output of the other antennas of the plurality of antennas to provide a combined signal.

2. The method of claim 1, wherein each antenna of the plurality of antennas is associated with a respective amplifier, and the output of each antenna comprises the output of the amplifier associated with the antenna, and wherein comparing the output of the first antenna of the plurality of antennas with the threshold based on output of at least one other antenna of the plurality of antennas comprises comparing the output of the amplifier associated with the first antenna with the threshold based on the output of the at least one amplifier associated with the at least one other antenna.

3. The method of claim 1, wherein the threshold is:
is based on a signal level of the output from the at least one other antenna; or
is based on a sum of signals based on outputs from the plurality of antennas, wherein the sum is scaled to provide the threshold.

4. The method of claim 1, wherein the threshold comprises a sum of scaled signals based on outputs from the plurality of antennas, wherein each signal output from each antenna is scaled by a respective factor associated with the antenna.

5. The method of claim 2, wherein the threshold is based on a sum of signals based on outputs from the plurality of antennas, wherein the sum is scaled to provide the threshold, further comprising rectifying at least one signal output from the least one other antenna to provide the signals based on the outputs of the antennas.

6. The method of claim 1, wherein the antenna apparatus comprises one or more signal combiners for combining signals from the antennas to provide the combined signal, and wherein selectively combining the output of the first antenna with the output of the other antennas of the plurality of antennas to provide the combined signal comprises selectively connecting the output of the first antenna to the one or more signal combiners based on the comparing.

7. The method of claim 1, wherein selectively combining the output of the first antenna with the output of the other antennas of the plurality of antennas to provide the combined signal comprises:
combining the output of the first antenna with the output of the other antennas when the output of the first antenna is greater than, or is greater than or equal to, the threshold; or
omitting the output of the first antenna from the combined signal when the output of the first antenna is less than the threshold; or
selectively operating a switch in a signal path of the first antenna based on the comparing.

8. The method of claim 1, wherein the antenna apparatus further comprises a plurality of transmitting apparatus, each transmitting apparatus associated with a respective one of the antennas, and the method further comprises selectively connecting a first transmitting apparatus of the plurality of transmitting apparatus to the first antenna based on the comparing.

9. Antenna apparatus comprising:
an antenna array comprising a plurality of antennas;
comparing apparatus configured to compare output of a first antenna of the plurality of antennas with a threshold based on output of at least one other antenna of the plurality of antennas; and
combining apparatus configured to selectively combine the output of the first antenna with the output of the other antennas of the plurality of antennas to provide a combined signal based on the comparing.

10. The apparatus of claim 9, further comprising a plurality of amplifiers, each amplifier associated with a respective one of the antennas, and the output of each antenna comprises the output of the amplifier associated with the antenna, and wherein the comparing apparatus is configured to compare the output of the first antenna of the plurality of antennas with the threshold based on output of at least one other antenna of the plurality of antennas by comparing the output of the amplifier associated with the first antenna with the threshold based on the output of the at least one amplifier associated with the at least one other antenna.

11. The apparatus of claim 9, wherein the threshold is:
based on a sum of signals based on outputs from the plurality of antennas, wherein the sum is scaled to provide the threshold; or
based on a signal level of the output from the at least one other antenna.

12. The apparatus of claim 9, further comprising a plurality of antenna output scaling apparatus, each antenna output scaling apparatus associated with a respective one of the antennas and configured to scale the output of the associated antennas, and wherein the threshold comprises a sum of scaled signals based on outputs from the plurality of antenna output scaling apparatus.

13. The apparatus of claim 12, wherein each antenna output scaling apparatus is configured to scale the output of the associated antenna by a respective factor associated with the antenna.

14. The apparatus of claim 10, wherein the threshold is based on a sum of signals based on outputs from the plurality of antennas, wherein the sum is scaled to provide the threshold, wherein the comparing apparatus comprises a plurality of signal rectifiers, each signal rectifier associated with a respective one of the antennas and configured to rectify the output of the associated antenna to provide the signals based on the outputs of the antennas.

15. The apparatus of claim 9, wherein the antenna apparatus comprises one or more signal combiners for combining signals from the antennas to provide the combined signal, and wherein the combining apparatus is configured to selectively combine the output of the first antenna with the output of the other antennas of the plurality of antennas to provide the combined signal by selectively connecting the output of the first antenna to the one or more signal combiners based on the comparing.

16. The apparatus of claim 15, wherein the antenna apparatus comprises at least one switch in a signal path of the output of the first antenna, and the combining apparatus is configured to selectively connect the output of the first antenna to the one or more signal combiners by selectively closing the at least one switch based on the comparing.

17. The apparatus of claim 9, wherein the combining apparatus is configured to selectively combine the output of the first antenna with the output of the other antennas of the plurality of antennas to provide the combined signal by:
combining the output of the first antenna with the output of the other antennas when the output of the first antenna is greater than, or is greater than or equal to, the threshold; or
omitting the output of the first antenna from the combined signal when the output of the first antenna is less than the threshold; or
selectively operating a switch in a signal path of the first antenna based on the comparing.

18. The apparatus of claim 9, further comprising a plurality of transmitting apparatus, each transmitting apparatus associated with a respective one of the antennas, and the antenna apparatus further comprises connection apparatus configured to selectively connect a first transmitting apparatus of the plurality of transmitting apparatus to the first antenna based on the comparing.

19. A receiver apparatus comprising an antenna apparatus, the antenna apparatus comprising:

an antenna array comprising a plurality of antennas;
comparing apparatus configured to compare output of a first antenna of the plurality of antennas with a threshold based on output of at least one other antenna of the plurality of antennas; and
combining apparatus configured to selectively combine the output of the first antenna with the output of the other antennas of the plurality of antennas to provide a combined signal based on the comparing.

20. The receiver apparatus of claim 19, wherein the receiver apparatus is configured to update beam forming parameters based on the comparing.

* * * * *